(12) United States Patent
Schnitzler et al.

(10) Patent No.: US 10,269,097 B2
(45) Date of Patent: Apr. 23, 2019

(54) MICROSCOPE AND METHOD FOR GENERATING A COMBINED IMAGE FROM MULTIPLE INDIVIDUAL IMAGES OF AN OBJECT

(71) Applicant: Leica Instruments (Singapore) Pte. Ltd., Singapore (SG)

(72) Inventors: Harald Schnitzler, Lüchingen (CH); Robert Paulus, Hergatz (DE); Guenter Grabher, Lustenau (AT)

(73) Assignee: Leica Instruments (Singapore) Pte. Ltd., Singapore (SG)

( * ) Notice: Subject to any disclaimer, the term of this patent is extended or adjusted under 35 U.S.C. 154(b) by 149 days.

(21) Appl. No.: 15/213,430

(22) Filed: Jul. 19, 2016

(65) Prior Publication Data

US 2017/0024859 A1    Jan. 26, 2017

(30) Foreign Application Priority Data

Jul. 24, 2015    (EP) .................................... 15178228

(51) Int. Cl.
  *G06K 9/40*    (2006.01)
  *G06T 5/00*    (2006.01)
  (Continued)

(52) U.S. Cl.
  CPC .............. *G06T 5/002* (2013.01); *G02B 21/06* (2013.01); *G02B 21/084* (2013.01);
  (Continued)

(58) Field of Classification Search
  CPC . G06T 5/002; G06T 7/97; G06T 2207/20212; G06T 2207/10152;
  (Continued)

(56) References Cited

U.S. PATENT DOCUMENTS 6,088,612 A    7/2000    Blair
2004/0021936 A1*    2/2004    Czarnetzki ............ G02B 21/06
                                                                  359/368

(Continued)

FOREIGN PATENT DOCUMENTS

JP    H05182026 A    7/1993
JP    H07121682 A    5/1995
(Continued)

*Primary Examiner* — Samir A Ahmed
(74) *Attorney, Agent, or Firm* — Hodgson Russ LLP (57) ABSTRACT

A microscope (10) for generating a combined image (34; 54; 64) from multiple individual images (28a to 28d; 52a to 52d; 62a to 62d) of an object (30; 50; 60) encompasses at least one illumination device (22) for illuminating the object (30; 50; 60) from at least two different illumination directions (24a, 24b); an image acquisition unit (26) for acquiring multiple individual images (28a to 28d; 52a to 52d; 62a to 62d) of the object (30; 50; 60) illuminated from the at least two different illumination directions (24a, 24b); and an image combination unit (32) for combining the individual images (28a to 28d; 52a to 52d; 62a to 62d) in order to obtain the combined image (34; 54; 64). The image combination unit (32) is embodied to combine the individual images (28a to 28d; 52a to 52d; 62a to 62d) so that an information loss connected with an image artifact of one of the individual images (28a to 28d; 52a to 52d; 62a to 62d) is compensated for utilizing an image datum of at least one other of the individual images (28a to 28d; 52a to 52d; 62a to 62d) in the combined image (34; 54; 64).

26 Claims, 8 Drawing Sheets (51) Int. Cl.
*G02B 21/06* (2006.01)
*G02B 21/08* (2006.01)
*G02B 21/36* (2006.01)
*H04N 5/225* (2006.01)
*G06T 7/00* (2017.01)

(52) U.S. Cl.
CPC .............. *G02B 21/367* (2013.01); *G06T 7/97* (2017.01); *H04N 5/2256* (2013.01); *G06T 2207/10056* (2013.01); *G06T 2207/10152* (2013.01); *G06T 2207/20182* (2013.01); *G06T 2207/20212* (2013.01)

(58) Field of Classification Search
CPC ........... G06T 2207/20182; G06T 2207/10056; H04N 5/2256; G02B 21/084; G02B 21/06
See application file for complete search history.

(56) References Cited

U.S. PATENT DOCUMENTS

| | | | |
|---|---|---|---|
| 2008/0297596 A1* | 12/2008 | Inomata | G06T 5/50 348/80 |
| 2010/0103511 A1 | 4/2010 | Soppelsa et al. | |
| 2010/0246993 A1* | 9/2010 | Rieger | G06T 5/006 382/275 |
| 2011/0115895 A1 | 5/2011 | Huisken | |
| 2012/0007839 A1 | 1/2012 | Tsao et al. | |
| 2012/0147224 A1* | 6/2012 | Takayama | G06T 3/4038 348/241 |
| 2012/0314568 A1* | 12/2012 | Tan | H04W 28/24 370/230 |
| 2013/0070336 A1* | 3/2013 | Thomas | G02B 21/082 359/385 |
| 2013/0314568 A1* | 11/2013 | Vranceanu | H04N 5/2355 348/239 |
| 2015/0244923 A1* | 8/2015 | Lee | H04N 5/35554 348/234 |

FOREIGN PATENT DOCUMENTS

| | | |
|---|---|---|
| JP | H0946557 A | 2/1997 |
| JP | H09197289 A | 7/1997 |
| JP | 2009134100 A | 6/2009 |
| JP | 2009258436 A | 11/2009 |
| JP | 2010518435 A | 5/2010 |
| JP | 2016009035 A | 1/2016 |
| WO | 2010/014244 A2 | 2/2010 |
| WO | 2014/036120 A1 | 3/2014 |

* cited by examiner

FIG. 2e $\alpha$ = const., $\beta$ = 0° $\qquad\qquad$ $\alpha$ = const., $\beta$ = 90°

FIG. 3a $\qquad\qquad\qquad$ FIG. 3b $\alpha$ = const., $\beta$ = 270° $\qquad\qquad$ $\alpha$ = const., $\beta$ = 180°

FIG. 3c $\qquad\qquad\qquad$ FIG. 3d

MICROSCOPE AND METHOD FOR GENERATING A COMBINED IMAGE FROM MULTIPLE INDIVIDUAL IMAGES OF AN OBJECT

CROSS REFERENCE TO RELATED APPLICATIONS

This application claims priority of European patent application number 15178228.1 filed Jul. 24, 2015, the entire disclosure of which is incorporated by reference herein.

FIELD OF THE INVENTION

The invention relates to a microscope for generating a combined image from multiple individual images of an object. The invention furthermore relates to a method for generating a combined image from multiple individual images of an object.

BACKGROUND OF THE INVENTION

When images are acquired in microscopy, regions having image artifacts typically occur in the image; due to over- or underexposure these contain little or no information and therefore reproduce no existing object details. This characteristic is dependent on the surface properties, sample topography, sample material, and illumination scenario.

So-called "high dynamic range" (HDR) algorithms, which are used to extend dynamic range, are known from the existing art. In these, multiple images having different illumination brightness levels and/or different exposure times are acquired, and are then combined into one image. This change in exposure times, however, results in limitations in terms of image brightness. These limitations influence the image refresh rate, which preferably should be high during utilization. In particular, an increase in the exposure time for acquisition of the images leads to a change or decrease in the image refresh rate. The aforesaid image artifacts cannot be sufficiently suppressed, however, when known HDR algorithms are used.

SUMMARY OF THE INVENTION

Proceeding from the known existing art, an object of the invention is to describe a microscope that generates a combined image from multiple individual images of an object, the microscope having a simple configuration and enabling high image quality for the combined image.

This object is achieved by a microscope and by a method having the features described herein. Advantageous refinements are also described herein.

A microscope having the features set forth herein makes possible a simple configuration and high image quality for the combined image because, in particular, the object is illuminated from at least two different illumination directions. Furthermore, multiple individual images of the object illuminated from the at least two different illumination directions are acquired. The combined image is moreover generated by combining the individual images. Upon combination of the individual images, compensation for an image information loss that is connected with an image artifact of one of the individual images is carried out using an image datum of at least one other of the individual images in the combined image. The image information loss occurring because of an image artifact can thus be avoided during image generation. This makes possible a simple configuration and high image quality for the combined image, which possesses more information content than each of the individual images. The individual images used for image combination can be created both with microscopes having an incident illumination device and with microscopes having transmitted illumination devices.

A microscope according to the present invention generates a combined image from multiple individual images of an object. For this, it illuminates the object from at least two different illumination directions using at least one illumination device. An image acquisition unit acquires multiple individual images of the object illuminated from at least two different illumination directions, combines the individual images using an image combination unit, and thereby generates the combined image. The image combination unit is embodied to compensate, upon combination of the individual images, for an information loss that is connected with an image artifact of one of the individual images utilizing an image datum of at least one other of the individual images in the combined image.

Preferably the image combination unit is embodied to ascertain an image artifact of one of the individual images from an automated evaluation of the individual images.

According to the present invention the microscope encompasses a single illumination device for illuminating the object from a first illumination direction and from a second illumination direction of the at least two different illumination directions. Alternatively thereto, according to the invention the microscope encompasses at least a first illumination device and a second illumination device. The first illumination device is embodied to illuminate the object from a first illumination direction of the at least two different illumination directions. Furthermore, the second illumination device is embodied to illuminate the object from a second illumination direction of the at least two different illumination directions. The at least two different illumination directions can thus be furnished relatively flexibly utilizing one or more illumination devices.

The image artifact encompasses, for example, a highlight region, an underexposed region, and/or a low-contrast region. These image regions can encompass individual pixels but usually relate to multiple contiguous pixels. The highlight region corresponds, for example, to an overexposed region that occurs due to reflection at a shiny surface of the object. For example, the object is a three-dimensional object having a shiny convex surface, with the result that both highlight regions and underexposed regions can occur. The image combination unit is embodied to ascertain at least one such image artifact region by performing a comparison of intensity values of the individual pixels of the individual images with an upper threshold value and/or with a lower predefined threshold value, and/or by performing a contrast evaluation of the image artifact region. Note in this context that a contrast evaluation can be performed only in contiguous regions having multiple pixels. No statement regarding contrast can be made by investigating individual pixels.

For example, a tolerance range for the permissible intensity of the evaluated pixels of the individual images can be defined by combined application of an upper threshold value and a lower threshold. Those pixels whose intensity values lie within that tolerance range are then used to create the combined image.

In the context of ascertaining an image artifact region, a highlight region respectively corresponds to at least one overexposed region of the respective individual image, the highlight region encompassing pixels such that their intensity is higher than a predetermined threshold value. A highlight region thus encompasses overexposed pixels that are connected with a loss of image information.

An underexposed region correspondingly encompasses pixels such that their intensity is lower than a predetermined threshold value. These too are connected with a loss of image information.

A low-contrast region encompasses pixels such that their contrast value is less than a predetermined contrast value. A loss of image information is connected with this as well.

The image acquisition unit is embodied to acquire the various respective individual images having an image artifact that exists in the form of a highlight region, and to associate the respective highlight regions with the at least two different illumination directions. A sequence of individual images each having different highlight regions can thus be furnished for image generation.

The highlight regions associated with the at least two different illumination directions each correspond to an overexposed region of the respective individual image. The different highlight regions thus correspond, for example, to different reflections from the shiny convex surface of the three-dimensional object illuminated from the at least two different illumination directions.

The image combination unit is embodied to identify a highlight region as an artifact of a selected individual image and to replace the highlight region, thereby identified, of the selected individual image with an image datum from a corresponding non-overexposed region of at least one individual image different from the selected individual image. For this, for example, those pixels of the other individual images which correspond to the highlight region to be corrected are correlated in order to arrive thereby at a substitute value for each pixel that is to be replaced. Alternatively, by evaluation of a region encompassing multiple pixels, for example a contrast evaluation, of the other images, the respectively best, for example highest-contrast, region can be ascertained. Other evaluations are of course conceivable and are encompassed by the idea of the invention. A so-called "pick and replace" algorithm can thus be implemented for image combination, by respectively inserting into the image artifact, i.e. in this case into the highlight region, the values of the respectively ascertained replacement pixels. The image quality in the combined image can be enhanced with the aid of this algorithm.

The non-overexposed region employed for correction of the image artifacts preferably encompasses pixels such that their intensity is no higher than a predetermined threshold value. Suitable pixel intensity values can thus be used as image information for the highlight region to be replaced in the "pick and replace" algorithm.

Optionally, the image combination unit is also embodied to identify an underexposed region of a selected individual image and to replace the identified underexposed region of the selected individual image with an image datum from a corresponding non-underexposed region of at least one individual image different from the selected individual image. The non-underexposed region encompasses, for example, pixels whose intensity is at least as high as a predetermined threshold value.

Preferably the illumination device is embodied to adjust the azimuth angle and/or the elevation angle of the at least two different illumination directions. The at least two different illumination angles for illumination of the object can thus be flexibly adjusted.

In an advantageous embodiment the image acquisition unit is embodied to acquire the individual images as a sequence of four chronologically successive individual images. The four chronologically successive individual images encompass a first to a fourth highlight region. The first to fourth highlight regions are furthermore associated with a first to a fourth illumination direction. For example, the first to fourth illumination directions respectively have an azimuth angle of 0°, 90°, 180°, and 270° and an identical elevation angle. A specific sequence of four individual images can thus be furnished for image generation. The highlight regions correspond here, for example, to an illumination of the object from the North, East, South, or West, always at the same elevation angle.

The illumination device can furthermore be embodied to generate the at least two different illumination directions utilizing a displaceable aperture stop in the illumination beam path of the microscope. Even more flexible generation of the at least two different illumination directions for illumination of the object can thereby be achieved.

For example, the illumination device encompasses a ring-light illumination apparatus, an arc illumination apparatus, and/or a variably arrangeable gooseneck illumination apparatus on a flexible gooseneck carrier. Different variants for illumination of the object can thus be furnished.

In an advantageous embodiment the illumination device encompasses a ring light having multiple LEDs integrated into the ring light. The LEDs are individually activatable. Segments of LEDs can furthermore be individually activated. A substantially point-like illumination or a segment-wise illumination of the object can thus be achieved. In particular, the at least two different illumination directions can be generated with the aid of the respectively activated LEDs or segments of LEDs.

Preferably the microscope is characterized by a control system for controlling the illumination device. The control system is embodied in such a way that a switchover occurs between a first illumination direction and a second illumination direction of the at least two different illumination directions. The switchover to the respectively current illumination direction can thus be carried out in controlled fashion.

Preferably the microscope is characterized by a control system that controls the image acquisition unit. The control system is embodied to acquire the individual images at a constant image refresh rate and thus to generate a live stream of multiple combined images. A live stream, or quasi-real-time transfer of high-quality synthetic images, can thus be achieved.

According to an exemplifying embodiment of the present invention a method for generating a combined image from multiple images of an object is furnished. The method encompasses: illuminating the object from at least two different illumination directions; acquiring multiple individual images of the object illuminated from the at least two different illumination directions; and generating the combined image by combining the individual images. Upon combination of the individual images, an image information loss that is connected with an image artifact of one of the individual images is compensated for utilizing an image datum of at least one other of the individual images in the combined image.

Variant embodiments of the invention have the advantage that an appreciable gain in image information can be achieved by the use of different illumination directions. This gain in image information is characterized in that more object details are visible in the combined image as compared with the individual images. It is particularly noteworthy that the gain in image information can be achieved, for example, utilizing an identical focus position for all the individual images of a sequence, with no need to apply a so-called "Z stacking" algorithm that requires images acquired with different focus settings.

In accordance with the method according to the present invention a highlight region, an underexposed region, and/or a low-contrast region can thus be ascertained as an image artifact region, by comparing the intensity values of the individual pixels of the individual images with an upper threshold value and/or with a lower predefined threshold value, and/or by performing a contrast evaluation of the image regions.

In an embodiment of the method the various individual images each having a highlight region are acquired and the respective highlight regions are associated with the at least two different illumination directions, the highlight regions associated with the at least two different illumination directions respectively corresponding to an overexposed region of the respective individual image.

The highlight regions are preferably identified by ascertaining those pixels whose intensity is higher than a predetermined threshold value.

For combination of the individual images, a highlight region of a selected individual image is identified and is replaced by an image datum that is obtained from a corresponding non-overexposed region of at least one individual image different from the selected individual image.

This can be done in such a way that the non-overexposed region encompasses pixels such that their intensity is no higher than a predetermined threshold value.

For combination of the individual images, an underexposed region of a selected individual image is identified and the underexposed region, thereby identified, of the selected individual image is replaced by an image datum that is obtained from a corresponding non-underexposed region of at least one individual image different from the selected individual image. The non-underexposed region encompasses pixels such that their intensity is at least as high as a predetermined threshold value.

In a further embodiment of the method the azimuth angle β and/or the elevation angle α of the at least two different illumination directions are set to specific values.

Advantageously, a sequence of multiple chronologically successive individual images is then acquired, the multiple chronologically successive individual images encompassing different image artifacts. The different image artifacts are associated with different illumination directions that are achieved with different azimuth angles β and/or different elevation angles α of the illumination directions.

In a further embodiment of the method at least two different illumination directions are generated utilizing a displaceable aperture stop in the illumination beam path of the microscope.

Another embodiment of the method is notable for controlling of an illumination device, a switchover occurring between a first illumination direction and a second illumination direction of the at least two different illumination directions.

The controlling of the image acquisition unit can be executed in such a way that the individual images are acquired at a constant image refresh rate $f_r$, and a live stream of multiple combined images is thus generated.

BRIEF DESCRIPTION OF THE DRAWING VIEWS

Further features and advantages of the invention are evident from the description below, which explains the invention in further detail with reference to exemplifying embodiments in conjunction with the appended Figures, in which:

FIG. 1b is an enlarged depiction of an illumination device of the digital microscope shown in FIG. 1a;

DETAILED DESCRIPTION OF THE INVENTION

Figure 1A:
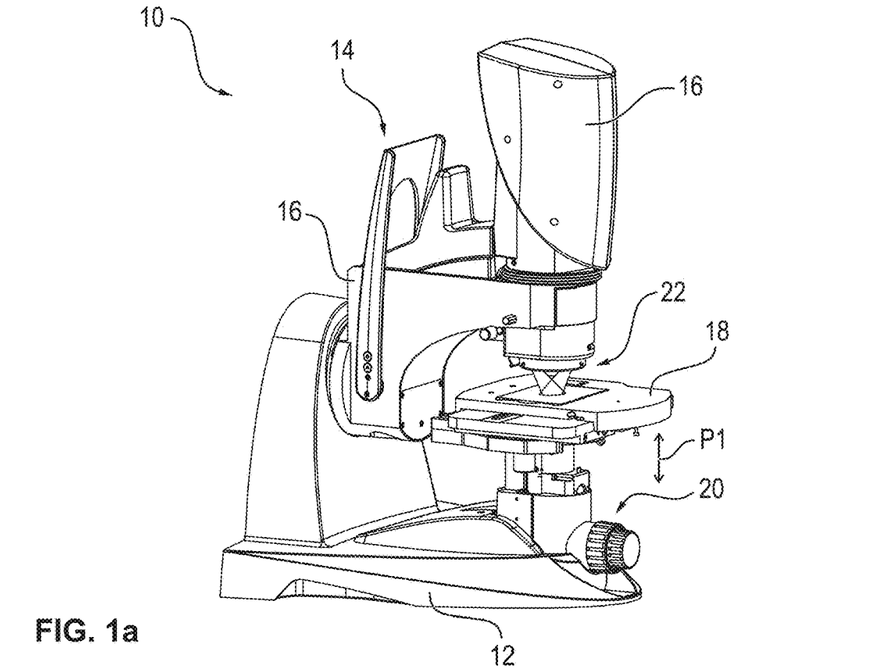
FIG. 1a is a schematic perspective depiction of a digital microscope according to an exemplifying embodiment of the present invention.

FIG. 1a is a schematic perspective depiction of a digital microscope 10 according to an exemplifying embodiment of the present invention. Digital microscope 10 shown in FIG. 1a encompasses a stationary stand body 12 and a pivot unit 14 pivotable relative thereto.

Pivot unit 14 encompasses an image acquisition unit, an objective system, and a zoom system. These components are not visible in FIG. 1a because they are concealed by housing 16 of pivot unit 14.

As shown in FIG. 1a, there is arranged on stand body 12 a specimen stage 18 on which the three-dimensional object to be investigated is mounted. This specimen stage 18 can be displaced relative to stand body 12 in the direction of double arrow P1 with the aid of adjusting wheels 20, so that focusing of the three-dimensional object to be investigated is possible.

Also schematically depicted in FIG. 1a is an illumination device 22 of digital microscope 10. Further details of illumination device 22 are also described below with reference to FIG. 1b. Digital microscope 10 shown in FIG. 1a further encompasses an image combination unit coupled to the image acquisition unit. Digital microscope 10 further encompasses a control system that is coupled to the illumination device and/or to the image acquisition unit. These components 40, 22, and 26 are respectively described in further detail with reference to FIGS. 5a and 5c. The image combination unit and the control system are not depicted in FIG. 1a. These respective components 32 and 40 are, for example, internal components or external components of digital microscope 10 shown in FIG. 1a.

Figure 1B:
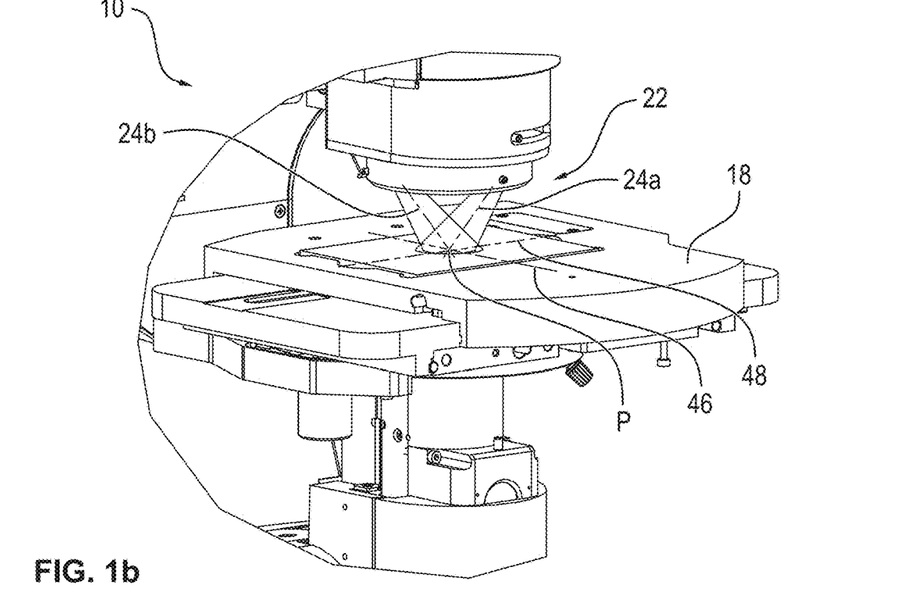

FIG. 1b is an enlarged depiction of illumination device 22 of digital microscope 10 shown in FIG. 1a. Illumination device 22 serves to illuminate the object from at least two different illumination directions 24a, 24b. The three-dimensional object that is to be investigated, located in the object plane, is not depicted in FIGS. 1a and 1b. As shown in FIG. 1b, the object plane encompasses a first axis 46, for example the X axis, and a second axis 48, for example the Y axis. The different illumination directions 24a, 24b that can be generated with the aid of illumination device 22 can each be defined relative to the coordinate system spanned by first and second axis 46, 48. In particular, the at least two different illumination directions 24a, 24b encompass a first illumination direction 24a and a second illumination direction 24b, whose azimuth angle and/or elevation angle is or are adjustable relative to that coordinate system. The azimuth angle is, for example, an angle, relative to first axis 46, which lies in the object plane. The elevation angle is furthermore, for example, an angle relative to the coordinate system spanned by the first and the second axis 46, 48. As shown in FIG. 1b, first and second illumination directions 24a, 24b intersect at a common point P located in the object plane. First and second illumination directions 24a, 24b furthermore respectively represent a preferred direction associated with a light cone. The light cones proceeding from illumination device 22, having first and second illumination directions 24a, 24b, overlap substantially in the object plane. The object located in the object plane can thus be completely illuminated.

According to FIG. 1b first and second illumination directions 24a, 24b each correspond to an illumination obliquely from above, i.e. at a specific angle relative to the optical axis of digital microscope 10, onto the object. Also according to FIG. 1b, the elevation angles of first and second illumination directions 24a, 24b are of equal magnitude, while the azimuth angles of first and second illumination directions 24a, 24b are different from one another. Highlight regions can thereby be generated at different locations on the surface of the object. According to FIG. 1b, however, image acquisition always occurs from the same observation direction.

Illumination device 22 shown in FIG. 1b encompasses in particular a ring light having multiple LEDs integrated into the ring light. The light cones with their respective preferred directions can be generated by individual activation of individual LEDs or by individual activation of segments of LEDs, each segment encompassing multiple LEDs of the ring light. According to FIG. 1b the light cone having first illumination direction 24a is generated by activating a first LED or a first segment of LEDs at a first point in time, while the light cone having second illumination direction 24b is generated by activating a second LED or a second segment of LEDs at a second, later point in time. The at least two different illumination directions 24a, 24b can thus be furnished sequentially. The respective illumination direction 24a, 24b corresponds to a direction along a connecting line from the respectively activated light source to the object.

Alternatively thereto, the at least two different illumination directions 24a, 24b can also be furnished simultaneously by multiple LEDs or multiple segments of LEDs.

In other exemplifying embodiments, instead of generating ring-light illumination, illumination device 22 serves to generate arc illumination (not illustrated). Alternatively or additionally, a variably arrangeable gooseneck illumination apparatus on a flexible gooseneck carrier can also be provided (not illustrated). In these cases both the azimuth angle and the elevation angle of the illumination direction are adjustable.

Optionally, illumination device 22 is embodied in such a way that the at least two different illumination directions 24a, 24b are generated using a displaceable aperture stop in the illumination beam path of microscope 10. This enables even more flexible illumination of the object.

Figure 1C:
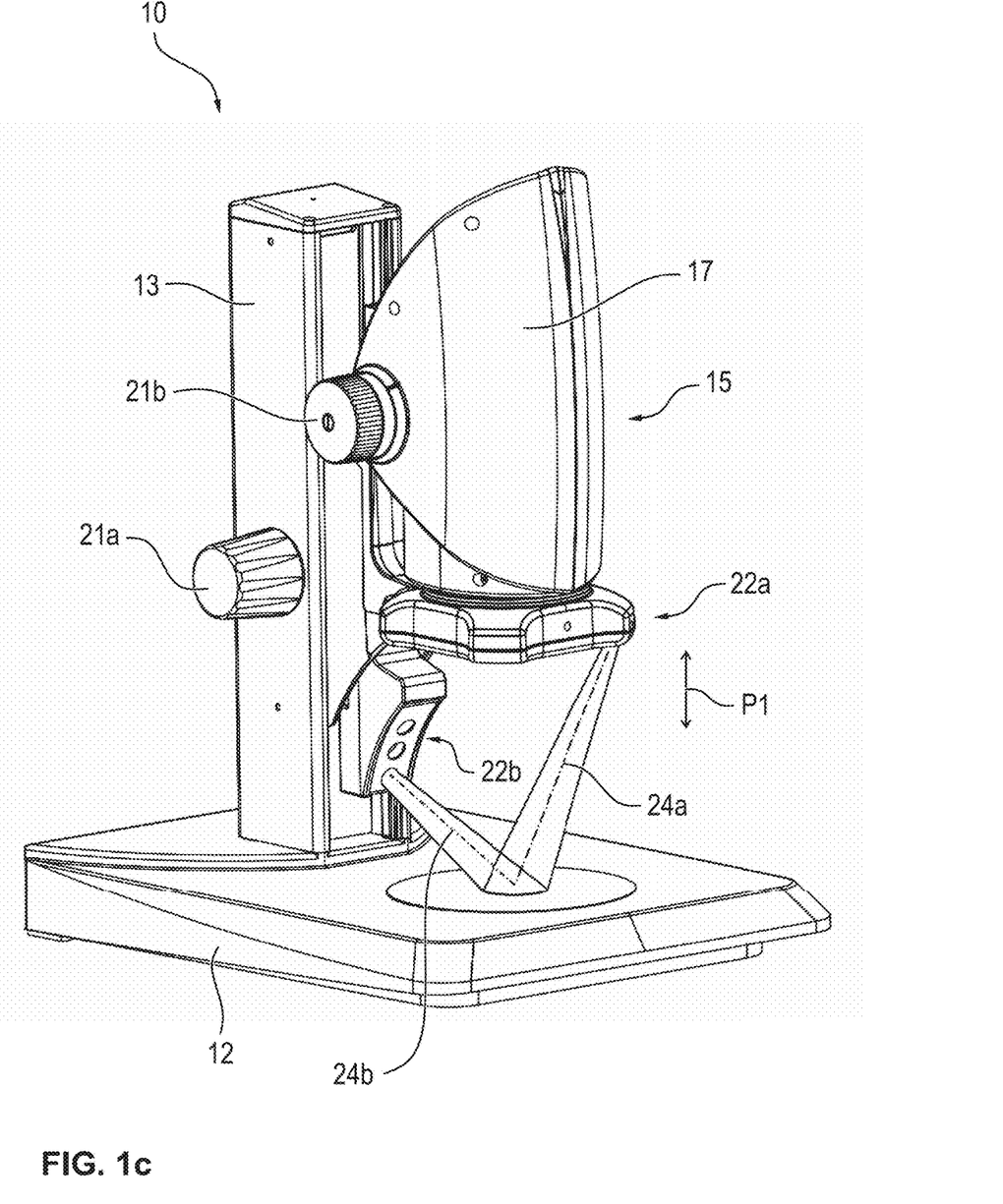
FIG. 1c is a schematic perspective depiction of a digital microscope according to an exemplifying embodiment of the present invention.

FIG. 1c is a schematic perspective depiction of a digital microscope 10 according to an exemplifying embodiment of the present invention. Digital microscope 10 shown in FIG. 1c encompasses a stationary stand body 12, a stand column 13 arranged perpendicularly to stand body 12, and a carrier arm 15 shiftable relative to stand column 13.

Carrier arm 15 encompasses a zoom optic and an image acquisition unit, for example a camera chip. These components are not visible in FIG. 1c since they are concealed by housing 17 of carrier arm 15.

As shown in FIG. 1c, an object plane into which the three-dimensional object to be investigated is brought is located on stand body 12. Carrier arm 15 can be displaced relative to stand body 12 in the direction of double arrow P1 with the aid of adjusting wheels 21a, 21b, thereby making possible focusing of the three-dimensional object to be investigated.

Also schematically depicted in FIG. 1c are a first and a second illumination device 22a, 22b of digital microscope 10. Digital microscope 10 shown in FIG. 1c furthermore encompasses an image combination unit coupled to the image acquisition unit. Digital microscope 10 furthermore encompasses a control system that is coupled to the first and the second illumination device and/or to the image acquisition unit. These respective components 40, 22a, 22b, and 26 are described in further detail with reference to FIGS. 5b and 5c. The image combination unit and the control system are not depicted in FIG. 1c.

Referring to FIG. 1c: first illumination device 22a serves to illuminate the object from a first illumination direction 24a of the at least two different illumination directions 24a, 24b, while second illumination device 22b serves to illuminate the object from a second illumination direction 24b of the at least two different illumination directions 24a, 24b. The three-dimensional object that is to be investigated and is located in the object plane is not depicted in FIG. 1c. First and second illumination directions 24a, 24b shown in FIG. 1c correspond substantially to first and second illumination directions 24a, 24b shown in FIG. 1b. An advantage in the context of the exemplifying embodiment shown in FIG. 1c, however, is that the elevation angle and azimuth angle of first illumination direction 24a and of second illumination direction 24b can be set differently from one another.

In the exemplifying embodiment of FIG. 1c, first illumination device 22a encompasses four LEDs that are arranged at equal angular spacings around the optical axis of digital microscope 10. Second illumination device 22b furthermore encompasses three LEDs that are arranged at different heights one above another. The object can thus be illuminated with the aid of first illumination device 22a from four illumination directions having different azimuth angles. The object can furthermore be illuminated with the aid of second illumination device 22b from three illumination directions having different elevation angles.

As shown in FIG. 1c, a carrier arm 15 projecting forward toward the user, on which first illumination device 22a is mounted, is attached to the vertical stand column 13. First illumination device 22a comprises four individual LEDs that are switchable separately or in groups, and thus enables illumination from four illumination directions. The zoom optic, into which the camera chip is integrated at the top end, is placed from above onto first illumination device 22a.

FIGS. 2a to 2d show an exemplifying first sequence of four chronologically successive individual images 28a to 28d of a three-dimensional object 30 having a first to a fourth highlight region 36a to 36d. Three-dimensional object 30 shown in FIGS. 2a to 2d is, in particular, a metal ball having an irregular shiny surface. The irregular surface is produced, for example by corrosion sites on the metal ball. The law of reflection applies at the surface of the metal ball shown in FIGS. 2a to 2d, i.e. light of illumination device 22 is reflected at the same angle at that surface. Reflections are thus produced at the surface of the metal ball. These reflections result in highlight regions or overexposed regions in individual images 28a to 28d of the first sequence which are acquired with the aid of image acquisition unit 26.

Object 30 is preferably a bearing ball of a ball bearing, i.e. of a rolling bearing.

Figure 2A:
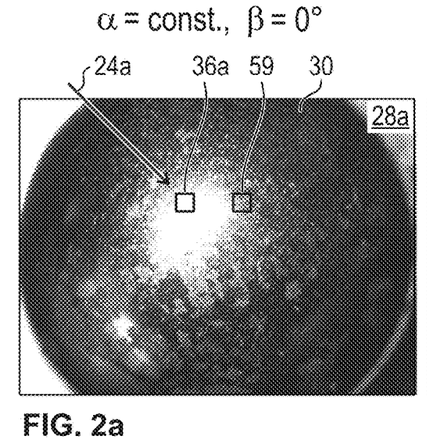
FIGS. 2a to 2d show an exemplifying first sequence of four chronologically successive individual images of a three-dimensional object having a first to a fourth highlight region.

FIG. 2a shows an acquired first individual image 28a of object 30 having a first highlight region 36a. First highlight region 36a of first individual image 28a is associated with a first illumination direction 24a. First illumination direction 24a has an azimuth angle of 0° ($\beta=0°$). This angle corresponds, for example, to first axis 46 of the coordinate system shown in FIG. 1b. First illumination direction 24a furthermore has an elevation angle arbitrarily predefined within the angle range from 0 to 90° ($\alpha$=constant).

First individual image 28a shown in FIG. 2a furthermore also encompasses an underexposed region 59. As shown in FIG. 2a, underexposed region 59 is arranged laterally alongside first highlight region 36a. Underexposed region 59 corresponds in particular to a dark region having no recognizable object details.

Figure 2B:
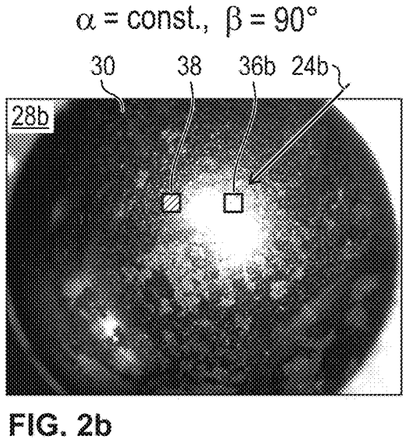

FIG. 2b shows an acquired second individual image 28b of object 30 having a second highlight region 36b. Second highlight region 36b of second individual image 28b is associated with a second illumination direction 24b. Second illumination direction 24b has an azimuth angle of 90° ($\beta=90°$). Second illumination direction 24b furthermore has an elevation angle arbitrarily predefined within the angle range from 0° to 90° ($\alpha$=constant).

Figure 2C:
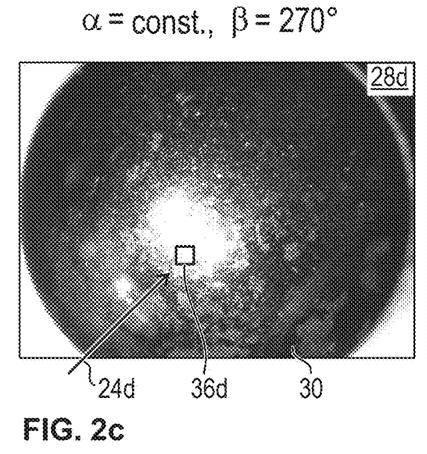
Figure 2D:
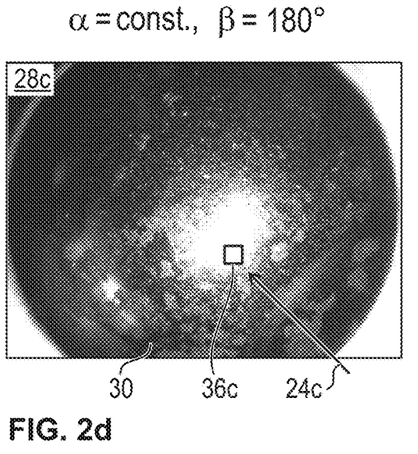

FIG. 2d shows an acquired third individual image 28c of object 30 having a third highlight region 36c. Third highlight region 36c of third individual image 28c is associated with a third illumination direction 24c. Third illumination direction 24c has an azimuth angle of 180° ($\beta=180°$). Third illumination direction 24c furthermore has an elevation angle arbitrarily predefined within the angle range from 0° to 90° ($\alpha$=constant).

FIG. 2c shows an acquired fourth individual image 28d of object 30 having a fourth highlight region 36d. Fourth highlight region 36d of fourth individual image 28d is associated with a fourth illumination direction 24d. Fourth illumination direction 24d has an azimuth angle of 270° ($\beta=270°$). Fourth illumination direction 24d furthermore has an elevation angle arbitrarily predefined within the angle range from 0° to 90° ($\alpha$=constant).

In FIGS. 2a to 2d, first to fourth highlight regions 36a to 36d correspond respectively to an illumination of object 30 from the North, East, South, and West ($\beta=0°, \ldots, 270°$). The illumination is always effected at the same elevation angle ($\alpha$=constant). Highlight regions 36a to 36d associated with first to fourth illumination directions 24a to 24d furthermore respectively correspond to an overexposed region of the respective individual image 28a to 28d. In particular, highlight regions 36a to 36d encompass pixels whose intensity is higher than a predetermined first threshold value. Highlight regions 36a to 36d correspond, for example, to a two-dimensional distribution of overexposed pixels having intensities above the predetermined first threshold value. For example, each highlight region 36a to 36d has a predefined number of pixels in each dimension of the two-dimensional distribution. The two-dimensional distribution corresponds, for example, to a square or circular region.

Figure 2E:
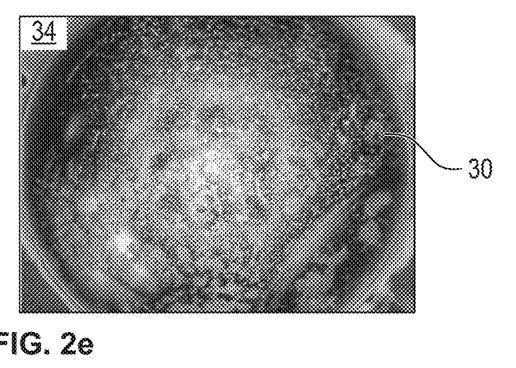
FIG. 2e shows an exemplifying combined image generated on the basis of the first sequence of individual images shown in FIGS. 2a to 2d.

FIG. 2e shows an exemplifying combined image 34 generated on the basis of the first sequence of individual images 28a to 28d which is shown in FIGS. 2a to 2d. Combined image 34 shown in FIG. 2e represents an image having a higher image quality as compared with individual images 28a to 28d of FIGS. 2a to 2d. Combined image 34 of FIG. 2e represents in particular an image of object 30 which does not encompass any highlight region or overexposed region connected with a loss of image information. For example, the intensity of all pixels of combined image 34 is no higher than the predetermined first threshold value.

FIGS. 2a to 2d thus depict, in particular, the surface of a metal ball which is illuminated from four different directions having correspondingly differing azimuth angles ($\beta=0°, 90°, 180°, 270°$) by means of segments of LEDs of a ring light, and with a constant elevation angle ($\alpha$=constant). FIG. 2e shows combined image 34 computed therefrom. It is evident in particular that highlight regions 36a to 36d, or the overexposed regions, of FIGS. 2a to 2d can be substantially eliminated, thereby increasing the information content in combined image 34.

Underexposed region 59 of FIG. 2a, connected with an information loss, can also be substantially eliminated. This results in the higher image quality of combined image 34 shown in FIG. 2e as compared with individual images 28a to 28d shown in FIGS. 2a to 2d. The gain in image information characterized by the better recognizability of object details in combined image 34 can thus be achieved.

The "pick and replace" algorithm on the basis of which combined image 34 shown in FIG. 23 is obtained will be described below by way of example. According to this exemplifying algorithm, for example, first highlight region 36a of first individual image 28a shown in FIG. 2a is identified, first individual image 28a being selected from the first sequence of individual images 28a to 28d which is shown in FIGS. 2a to 2d. The identified first highlight region 36a of first individual image 28a is furthermore replaced, for example, by an image datum from a corresponding non-overexposed region 38 of second individual image 28b of the first sequence of individual images 28a to 28d. The identified first highlight region 36a of first individual image 28a can furthermore also be replaced by an image datum from a corresponding non-overexposed region of the other individual images 28c, 28d of the first sequence of individual images 28a to 28d. The image datum, derived in particular from non-overexposed region 38 of second individual image 28b, corresponds to pixel intensity values for replacement of the pixel intensity values of first highlight region 36a of first individual image 28a.

Non-overexposed region 38 of second individual image 28b has a two-dimensional distribution of pixels at a specific location in second individual image 28b. The dimensions and location of the two-dimensional distribution of pixels of non-overexposed region 38 in second individual image 28b correspond to the dimensions and location of the two-dimensional distribution of pixels of first highlight region 36a in first individual image 28a. Non-overexposed region 38 of second individual image 28b furthermore encompasses pixels whose intensity is no higher than the predetermined first threshold value.

FIGS. 3a to 3d show an exemplifying second sequence of four chronologically successive individual images 52a to 52d of a three-dimensional object 50 having a first to a fourth highlight region 56a to 56d and an underexposed region 58. FIGS. 4a to 4d show an exemplifying third sequence of four chronologically successive individual images 62a to 62d of a three-dimensional object 60 having a first to a fourth highlight region 66a to 66d and an underexposed region 68. Three-dimensional object 50 shown in FIGS. 3a to 3d is, for example, a bolt head with a slot, having an irregular shiny surface. Furthermore, three-dimensional object 60 shown in FIGS. 4a to 4d is, for example, the front end of a bolt which does not have a central tip, having an irregular shiny surface. Highlight regions 56a to 56d in individual images 52a to 52d of the second sequence, shown in FIGS. 3a to 3d, as well as highlight regions 66a to 66d in individual images 62a to 62d of the third sequence, shown in FIGS. 4a to 4d, correspond, in terms of their association with the respective illumination directions 24a to 24d, to highlight regions 36a to 36d in individual images 28a to 28d of the first sequence, shown in FIGS. 2a to 2d. Highlight regions 56a to 56d and 66a to 66d, however, respectively represent regions having pixels whose intensity is neither above the predetermined first threshold value nor below a predetermined second threshold value, the predetermined second threshold value being lower than the predetermined first threshold value. In other words, highlight regions 56a to 56d and 66a to 66d respectively encompass neither overexposed pixels nor underexposed pixels.

Figure 3A:
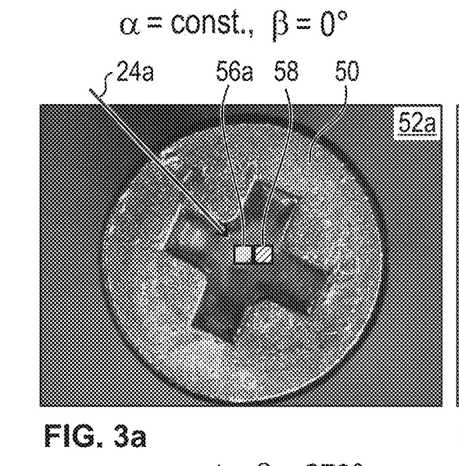
FIGS. 3a to 3d show an exemplifying second sequence of four chronologically successive individual images of a three-dimensional object having a first to a fourth highlight region and an underexposed region.
Figure 3B:
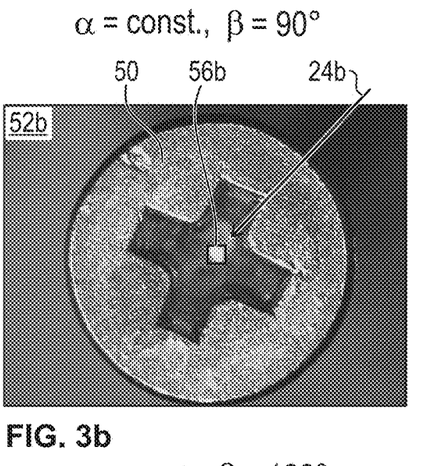
Figure 3C:
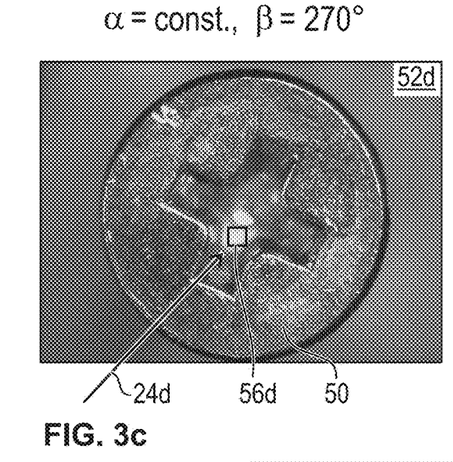
Figure 3D:
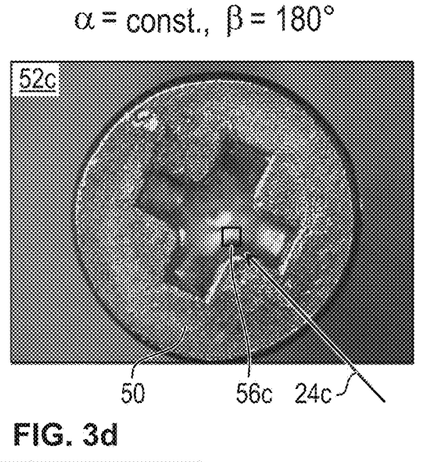
Figure 4A:
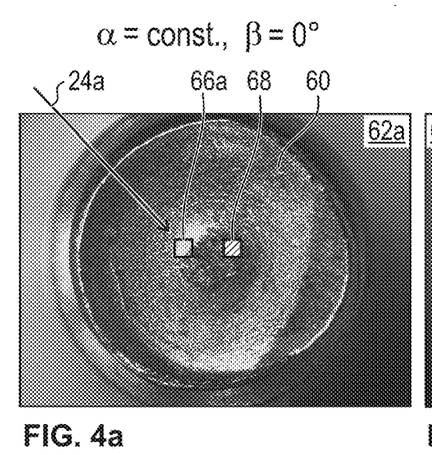
FIGS. 4a to 4d show an exemplifying third sequence of four chronologically successive individual images of a three-dimensional object having a first to a fourth highlight region and an underexposed region.
Figure 4B:
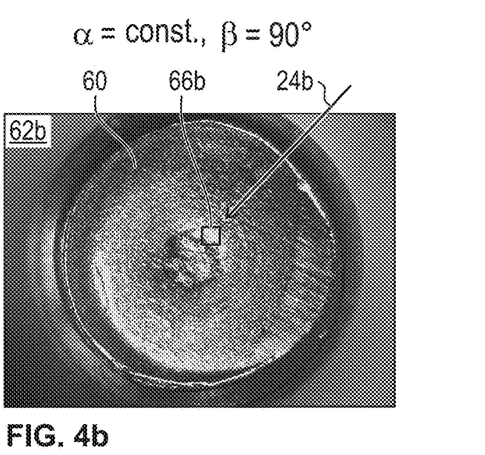
Figure 4C:
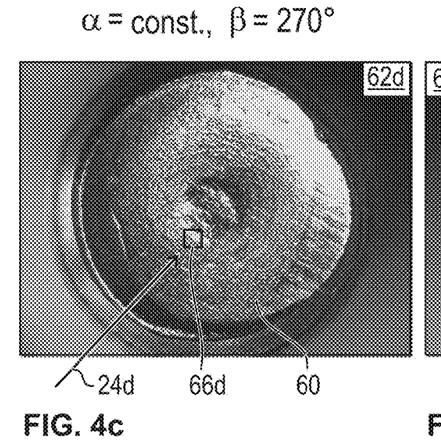
Figure 4D:
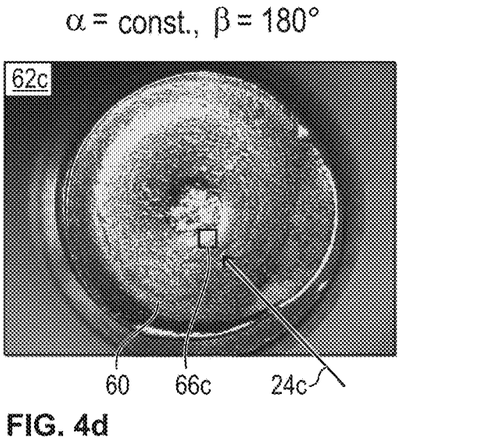

First individual image 52a of the second sequence, shown in FIG. 3a, as well as first individual image 62a of the third sequence, shown in FIG. 4a, furthermore each encompass a respective underexposed region 58, 68. The respective underexposed region 58, 68 in particular encompasses pixels whose intensity is lower than the predetermined second threshold. Underexposed regions 58, 68 correspond, for example, to a two-dimensional distribution of underexposed pixels having intensities below the predetermined second threshold. The respective highlight regions 56a to 56d and 66a to 66d thus represent relatively bright regions, while underexposed regions 58, 68 represent relatively dark regions.

Figure 3E:
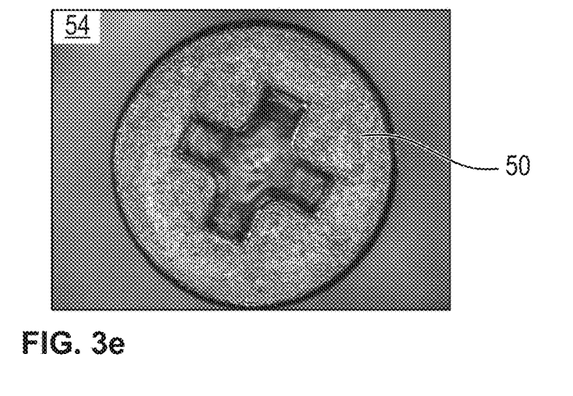
FIG. 3e shows an exemplifying combined image generated on the basis of the second sequence of individual images shown in FIGS. 3a to 3d.
Figure 4E:
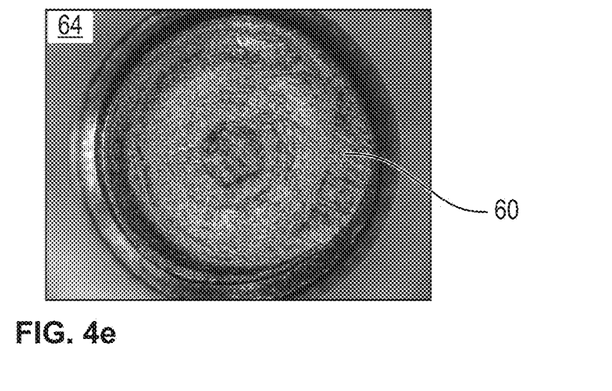
FIG. 4e shows an exemplifying combined image generated on the basis of the third sequence of individual images shown in FIGS. 4a to 4d.

FIG. 3e shows an exemplifying combined image 54 generated on the basis of the second sequence, shown in FIGS. 3a to 3d, of individual images 52a to 52d. FIG. 4e shows an exemplifying combined image 64 generated on the basis of the third sequence, shown in FIGS. 4a to 4d, of individual images 62a to 62d. Combined image 54 shown in FIG. 3e and combined image 64 shown in FIG. 4e respectively represent an image having a higher image quality as compared respectively with individual images 52a to 52d of FIGS. 3a to 3d and 62a to 62d of FIGS. 4a to 4d. Combined image 54 of FIG. 3e and combined image 64 of FIG. 4e respectively represent in particular an image of object 50, 60 which does not encompass an underexposed region connected with a loss of image information. For example, the intensity of all pixels of the respective combined image 54 or 64 is at least as high as the predetermined second threshold value.

It is evident in particular from FIGS. 3e and 4e that the respective underexposed region 58, 68 from FIGS. 3a and 4a can be substantially eliminated. The information content in combined image 54, 64 is thereby increased.

The same focus setting was used in each case to acquire the first to third sequences of individual images 28a to 28d, 52a to 52d, and 62a to 62d shown respectively in FIGS. 2a to 2d, 3a to 3d, and 4a to 4d. In particular, upon acquisition of the first sequence the focus was in each case on the surface of ball 30 at the center of ball 30. Furthermore, upon acquisition of the second sequence the focus was in each case on the top end of bolt head 50, while upon acquisition of the third sequence the focus was in each case on the surface of the top edge of the front end of bolt 60. With this focus, sub-regions (for example the regions encompassed by the slot of bolt head 50) are located outside the depth-of-focus range. As illustrated with reference to FIG. 3e, that corresponding sub-region of combined image, for example of combined image 54, which is located outside the depth-of-focus range nevertheless contains more object details. A gain in image information can thus be achieved even in that sub-region of combined image 34, 54, 64 which is located outside the depth-of-focus range. This gain in image information can furthermore be utilized in order to further improve the focus setting.

Combined image 54, 64 shown in FIGS. 3e and 4e is generated using a "pick and replace" algorithm. According to this exemplifying algorithm the respective underexposed region 58, 68 of first individual image 52a, 62a shown respectively in FIGS. 3a and 4a is identified. First individual image 52a is selected from the second sequence of individual images 52a to 52d shown in FIGS. 3a to 3d. Furthermore, first individual image 62a is selected from the third sequence of individual images 62a to 62d shown in FIGS. 4a to 4d. The identified underexposed region 58, 68 of first individual image 52a, 62a is replaced, for example, by an image datum from a corresponding highlight region 56b, 66b of second individual image 52b, 62b respectively of the second and third sequence of individual images 52a to 52d, 62a to 62d. The image datum derived from highlight region 56b, 66b of second individual image 52b, 62b corresponds here to pixel intensity values for replacing the pixel intensity values of underexposed region 58, 68 of first individual image 52a, 62a.

Highlight region 56b, 66b of second individual image 52b, 62b preferably has a two-dimensional distribution of pixels at a specific location in second individual image 52b, 62b. The dimensions and location of the two-dimensional distribution of pixels of highlight region 56b, 66b in second individual image 52b, 62b correspond, for example, to the dimensions and location of the two-dimensional distribution of pixels of underexposed region 58, 68 in first individual image 52a, 62a.

The "pick and replace" algorithm described respectively with reference to FIGS. 2a to 2e, 3a to 3e, and 4a to 4e is carried out with the aid of image combination unit 32.

Figure 5A:
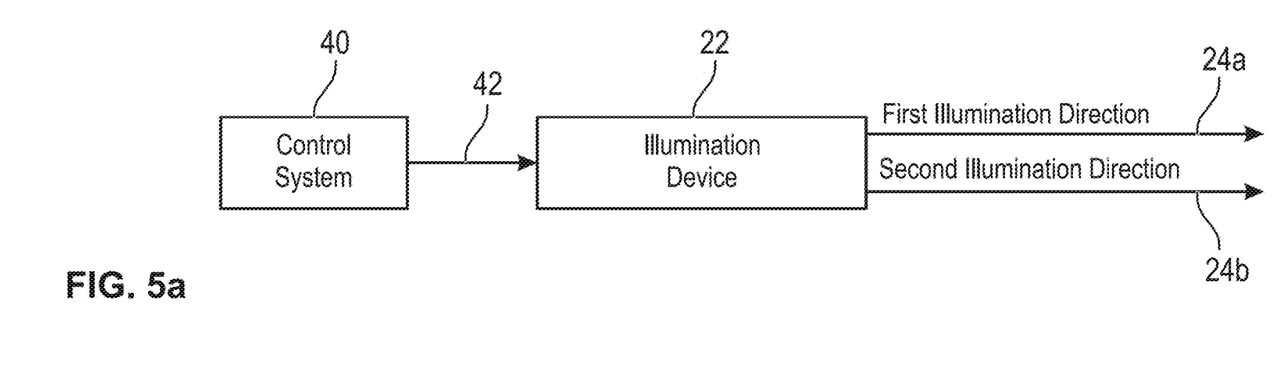
FIG. 5a is a block diagram of components of the digital microscope shown in FIG. 1a, having a control system and an illumination device.
Figure 5B:
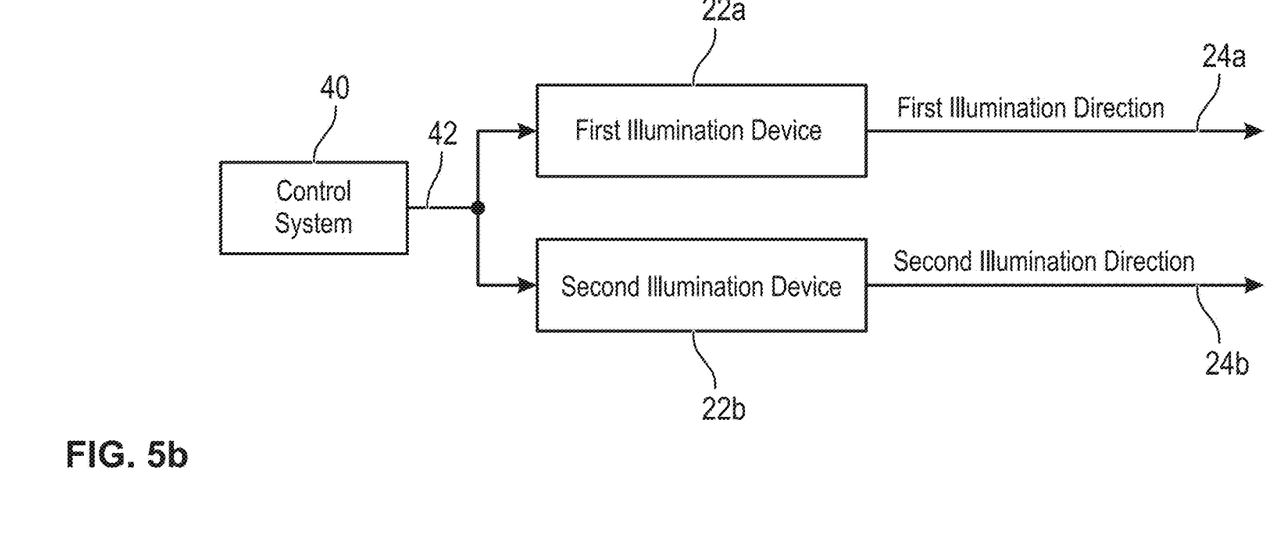
FIG. 5b is a block diagram of components of the digital microscope shown in FIG. 1c, having a control system, a first illumination device, and a second illumination device.

FIG. 5a is a block diagram of components of digital microscope 10 shown in FIG. 1a, having a control system 40 and an illumination device 22. As shown in FIG. 5b, illumination device 22 is coupled to control system 40. Control system 40 serves to control illumination device 22 utilizing a control signal 42. As shown in FIG. 5a, illumination device 22 is activated with the aid of control signal 42 in such a way that a switchover occurs between first illumination direction 24a and second illumination direction 24b. A switchover between first and second illumination directions 24a, 24b shown in FIG. 1b can thus be carried out automatically.

A variant image acquisition operation can involve continuously acquiring and assembling images and manually modifying the illumination direction in that context, e.g. by changing the positioning of the gooseneck illumination apparatus. Alternatively, the switchover can also proceed in automatically controlled fashion, for example by switching over to an arc illumination system.

FIG. 5b is a block diagram of components of digital microscope 10 shown in FIG. 1c, having a control system 40, a first illumination device 22a, and a second illumination device 22b. As shown in FIG. 5b, first and second illumination device 22a, 22b are coupled to control system 40. Control system 40 serves to control first and second illumination device 22a, 22b utilizing a control signal 42. As shown in FIG. 5b, first and second illumination device 22a, 22b are activated with the aid of control signal 42, for example in such a way that a switchover occurs between first illumination direction 24a and second illumination direction 24b. A switchover between first and second illumination directions 24a, 24b shown in FIG. 1c can thus be carried out automatically.

Figure 5C:
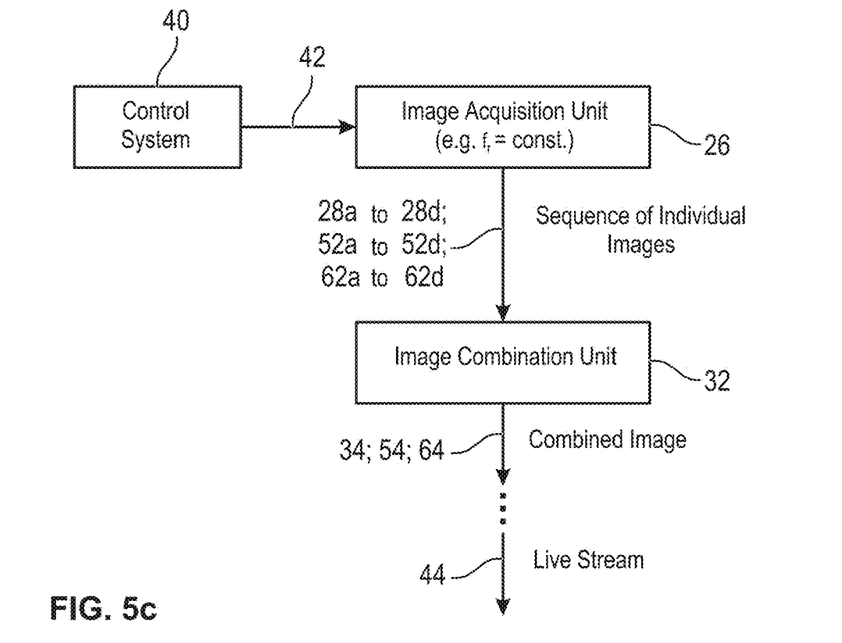
FIG. 5c is a block diagram of components of the digital microscope shown in FIG. 1a, having a control system, an image acquisition unit, and an image combination unit.

FIG. 5c is a block diagram of further components of digital microscope 10 shown in FIG. 1a, having a control system 40, an image acquisition unit 26, and an image combination unit 32. As shown in FIG. 5c, image acquisition unit 26 is coupled to control system 40. Image combination unit 32 is furthermore coupled to image acquisition unit 26. Control system 40 serves to control image acquisition unit 26 utilizing a control signal 42. Image acquisition unit 26 is activated with the aid of control signal 42 in such a way that individual images 28a to 28d, 52a to 52d, 62a to 62d of the exemplifying first to third sequences, shown respectively in FIGS. 2a to 2d, 3a to 3d, and 4a to 4d, are acquired at a constant image refresh rate, i.e. $f_r$=constant. Individual images 28a to 28d, 52a to 52d, 62a to 62d of the first to third sequences are combined with the aid of image combination unit 32, utilizing a suitable algorithm, in such a way that combined image 34, 54, 64 having comparatively high image quality is obtained. A live stream 44 of multiple combined images can furthermore be generated utilizing the constant image refresh rate.

Figure 6:
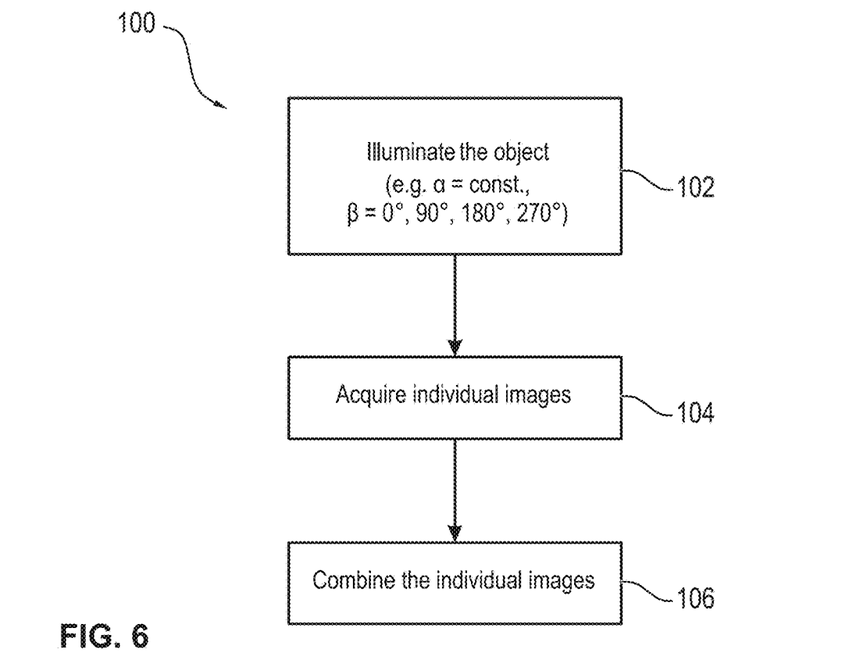
FIG. 6 is a flow chart of a method executable with the digital microscope shown in FIG. 1a, according to an exemplifying embodiment of the present invention.

FIG. 6 is a flow chart of a method 100, capable of being carried out with digital microscope 10 shown in FIG. 1a, according to an exemplifying embodiment of the present invention. Method 100 serves to generate combined image 34, 54, 64 from the first to third sequence of individual images 28a to 28d, 52a to 52d, 62a to 62d of object 30, 50, 60. As shown in FIG. 6, method 100 encompasses illuminating 102 object 30, 50, 60 from the at least two different illumination directions 24a, 24b. For example, the elevation angle here is constant, i.e. α=constant, while the azimuth angle corresponds to illumination of object 30, 50, 60 from the North, East, South, or West, i.e. β=0°, 90°, 180°, 270°. Method 100 furthermore encompasses acquiring 104 the first to third sequences of individual images 28a to 28d, 52a to 52d, 62a to 62d of object 30, 50, 60 illuminated from the at least two different illumination directions 24a, 24b, as well as combining 106 individual images 28a to 28d, 52a to 52d, 62a to 62d of the first to third sequences in order to obtain combined image 34, 54, 64. Individual images 28a to 28d, 52a to 52d, 62a to 62d of the first to third sequences are combined 106, for example, utilizing the algorithm described respectively with reference to FIGS. 2a to 2d, 3a to 3d, and 4a to 4d.

The present invention makes use of the fact that illumination in microscopy can be actively configured and influenced. According to the present invention, different illumination modes and illumination scenarios can be established. Some advantages of the present invention are described below.

According to the existing art it is often possible to establish optimum illumination only for sub-regions of the image field and not, as is desirable, simultaneously over the entire image field. A substantial improvement with respect to the existing art consists, according to the present invention, in the combining of images that are acquired using different illumination scenarios. What is used here for combination, for example, are zones of images 28a to 28d (e.g. region 38 shown in FIG. 2b) that locally yield the best respective image impression and are not impaired by local deficiencies, for example reflections, underexposure, overexposure, or low contrast. Images 28a to 28d can be combined into combined image 34, for example, by means of the "pick and replace" algorithm described with reference to FIGS. 2a to 2d.

It has been recognized that an appreciable difference exists between a conventional HDR algorithm and the "pick and replace" algorithm according to the present invention. A conventional HDR algorithm expects image data in which the light quantity acquired by the image acquisition unit has been varied. An expanded dynamic range (HDR) is thereby captured. In contrast to this, according to the present invention what is varied is illumination direction 24a, 24b, i.e. the illumination scenario. The result is that, in particular, image artifacts, for example direct reflections of the LED light source on the sample or object, are directly avoided. This allows much more efficient capture, in particular in terms of reflection, as compared with a conventional HDR image.

Exemplifying embodiments of the present invention create an image-producing system for a digital microscope 10, the image-producing system encompassing an illumination device 22, an image acquisition unit 26, and an image combination unit 32 having a software unit. Illumination device 22 serves to generate at least two illumination scenarios. Image acquisition unit 26 serves to digitize the chronologically successive images 28a to 28d, 52a to 52d, 62a to 62d acquired under different illumination scenarios. The software unit of image combination unit 32 serves to generate a synthetic image, i.e. combined image 34, 54, 64, from individual images 28a to 28d, 52a to 52d, 62a to 62d.

According to exemplifying embodiments the at least two illumination scenarios differ in terms of the illumination direction or light direction that is radiated by them onto the sample. The algorithm for generating synthetic image 34, 54, 64 can be, for example, an algorithm that combines individual zones of individual images 28a to 28d, 52a to 52d, 62a to 62d into the synthetic image 34, 54, 64 ("pick and replace" algorithm).

According to exemplifying embodiments, generation of a live stream 44 of synthetic images without or with greatly reduced over- or underexposed regions can be implemented at a constant image refresh rate.

According to exemplifying embodiments a preview having, for example, 3×3 synthetic images that have been generated with the aid of different algorithms or illumination scenarios can furthermore be displayed. This preview serves for simple selection, by the user, of the most appropriate variant.

The present invention enables the generation of images without or with greatly reduced under- and overexposed regions. Individual images 28a to 28d necessary for this are acquired using different illumination scenarios. The following variations are possible according to the present invention: The azimuthal illumination direction, for example from North, South, East, West, can be varied. The elevation angle for the illumination (e.g. coaxial, almost-vertical, oblique lighting, raking light, or darkfield characteristics) can also be varied. The type of light source, for example spot, line, area, ring, ring segment, or diffuse, can also be selected. The illumination aperture can moreover be variably adjusted.

A microscope having an image-producing system for the acquisition of color images can also be implemented.

According to exemplifying embodiments, microscope 10 is a digital microscope that has no eyepieces. In other words, the images are presented exclusively on a display (not shown).

According to exemplifying embodiments the gain in image information can be achieved solely by the use of different illumination directions, although the focus point of the objective or of the imaging system, for example a zoom optic, remains unchanged. This is evident, for example, from the unsharp regions of ball 30 shown in FIGS. 2a to 2d at the edges of images 28a to 28d, which are located outside the depth-of-focus range of the imaging optic.

In addition, an image sequence of this kind can also be implemented for different focus points in a Z direction, i.e. in the direction of the optical axis; this then not only enhances image details thanks to variation of the illumination situation, but also produces an image of the object (ball, etc.) having an expanded depth-of-focus range, in which the for each image sequence generated according to the present invention (for example, four images with different illumination directions for each Z position of the focus) are correlated as a Z image stack to yield an image with full depth of field.

Figure 7:
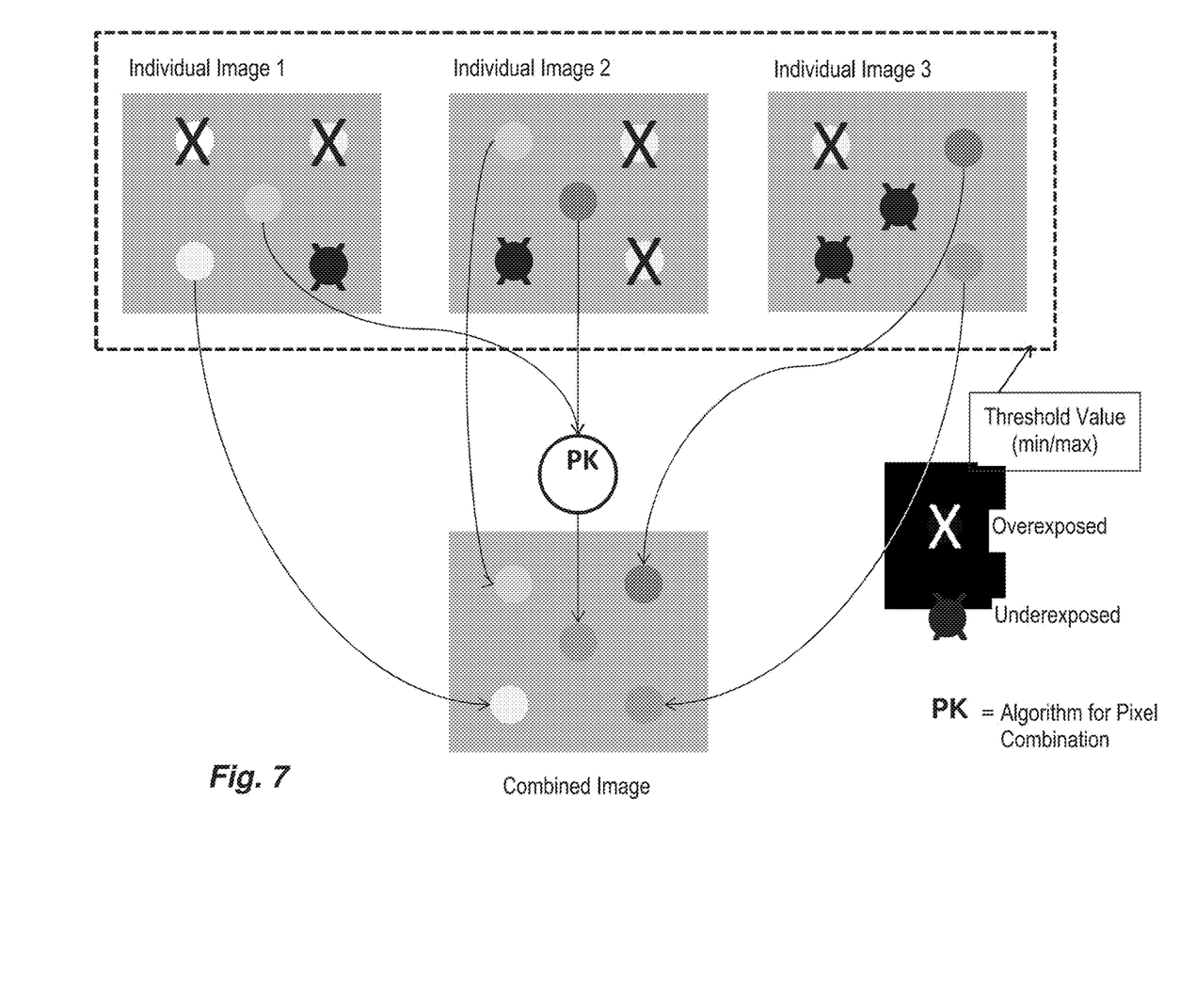
FIG. 7 schematically depicts the combination principle for generating a combined image.

FIG. 7 is a schematic depiction of the combination principle for generating a combined image. An image sequence of three individual images, namely individual image 1, individual image 2, and individual image 3, is shown. These were each acquired, with no change in focus point, in different illumination situations at the same location on a sample, the illumination direction having been modified from one individual image to another. The same sample sites were thereby differently illuminated in each case, and appear variously bright or dark in the respective individual image.

Brightly illuminated regions, depicted as circles of differing brightness, were produced in the three individual images. Overexposed regions are depicted as light-colored circles struck through with an "X". They represent an image artifact or image artifact region.

More dimly illuminated regions were also acquired in the three images. They are depicted as variously gray circles. Underexposed regions are depicted as black circles struck through with an "X". They too represent an image artifact or image artifact region.

It is clearly evident that because of the different illumination settings in the three individual images of the image sequence, the regions illuminated with different intensities are each located at different locations in the images.

The combination image is shown at the bottom center. It is produced by compensating for the image artifacts of the three individual images utilizing the usable regions of the respective other individual images.

Arrows from the three individual images 1, 2, and 3 indicate which artifact regions in the combined image were compensated for by transferring pixel regions from one of the individual images. For example, the two upper regions in individual image 1 are respectively image artifact regions in the form of overexposed regions, and have been replaced by corresponding regions from individual images 2 and 3. The region at the center in individual image 1 was too bright and was obtained by pixel combination by combining the center regions of individual images 1 and 2, i.e. by correlating the intensities using an algorithm for pixel combination (labeled "PK" in FIG. 7).

Although many aspects have been described in conjunction with an apparatus, it is understood that these aspects also represent a description of the corresponding method, so that a block or component of an apparatus is also to be understood as a corresponding method step or as a feature of a method step. Analogously thereto, aspects that have been described in conjunction with, or as, a method step also represent a description of a corresponding block or detail or feature of a corresponding apparatus.

PARTS LIST

10 Microscope
12 Stand body
14 Pivot unit
16 Housing
18 Specimen stage
20 Adjusting wheel
22, 22a, 22b Illumination device
24a to 24d Illumination direction
26 Image acquisition unit
28b to 28d, 52a to 52d, 62a to 62d Individual images
30, 50, 60 Object
32 Image combination unit
34, 54, 64 Combined image
36a to 36d, 56a, to 56d, 66a to 66d Highlight region
38 Non-overexposed region
40 Control system
42 Control signal
44 Live stream
46, 48 Axis of coordinate system
58, 59, 68 Underexposed region
102, 104, 106 Method step
P Point in object plane
P1 Direction

What is claimed is:

1. A microscope (10) that generates a combined image (34; 54; 64) from multiple individual images (28a to 28d; 52a to 52d; 62a to 62d) of an object (30; 50; 60), the microscope (10) comprising:
    at least one illumination device (22; 22a; 22b) that illuminates the object (30; 50; 60) from at least two different illumination directions (24a, 24b), wherein the illumination device (22) is configured to adjust an azimuth angle ($\square$) and an elevation angle ($\square$) of the at least two different illumination directions (24a, 24b), and wherein the illumination device (22) includes a ring-light illumination apparatus or an arc illumination apparatus;
    an image acquisition unit (26) that acquires multiple individual images (28a to 28d; 52a to 52d; 62a to 62d) of the object (30; 50; 60) illuminated from the at least two different illumination directions (24a, 24b); and
    an image combination unit (32) comprising a processor that combines the individual images (28a to 28d; 52a to 52d; 62a to 62d) and thereby generates the combined image (34; 54; 64), wherein the image combination unit (32) is configured to compensate, upon combination of the individual images (28a to 28d; 52a to 52d; 62a to 62d), for an information loss connected with an image artifact of one of the individual images (28a to 28d; 52a to 52d; 62a to 62d) utilizing an image datum of at least one other of the individual images (28a to 28d; 52a to 52d; 62a to 62d) in the combined image (34; 54; 64).

2. The microscope (10) according to claim 1, wherein the image combination unit (32) is configured to ascertain an image artifact of one of the individual images (28a to 28d; 52a to 52d; 62a to 62d) from an automated evaluation of the individual images (28a to 28d; 52a to 52d; 62a to 62d).

3. The microscope (10) according to claim 1, wherein the image artifact includes an overexposed highlight region (36a), an underexposed region (58; 68), and/or a low-contrast region; and the image combination unit (32) is configured to ascertain at least one such image artifact region by performing a comparison of intensity values of the individual pixels of the individual images (28a to 28d; 52a to 52d; 62a to 62d) with an upper threshold value and/or with a lower predefined threshold value, and/or by performing a contrast evaluation of the image regions.

4. The microscope (10) according to claim 3, wherein the highlight region (36a to 36d) corresponds respectively to an overexposed region of the respective individual image (28a to 28d), the highlight region (36a to 36d) including pixels having an intensity greater than a predetermined threshold value.

5. The microscope (10) according to claim 3, wherein the underexposed region (58; 68) includes pixels having an intensity less than a predetermined threshold value.

6. The microscope (10) according to claim 3, wherein the low-contrast region (58; 68) includes pixels having a contrast value less than a predetermined contrast value.

7. The microscope according to claim 1, wherein the image acquisition unit (26) is configured to acquire the various individual images (28a to 28d) each having a highlight region (36a to 36d) as an image artifact, and to associate the respective highlight regions (36a to 36d) with the at least two different illumination directions (24a, 24b).

8. The microscope (10) according to claim 1, wherein the image combination unit (32) is configured to identify a highlight region (36a) as an artifact of a selected individual image (28a) and to replace the identified highlight region (36a) of the selected individual image (28a) with an image datum from a corresponding non-overexposed region (38) of at least one individual image (28b) different from the selected individual image (28a), the non-overexposed region (38) including pixels whose intensity is no greater than a predetermined threshold value.

9. The microscope (10) according to claim 1, wherein the image combination unit (32) is configured to identify an underexposed region (58; 68) as an artifact of a selected individual image (52a; 62a) and to replace the identified underexposed region (58; 68) of the selected individual image (52a; 62a) with an image datum from a corresponding non-underexposed region (56b; 66b) of at least one individual image (52b; 62b) different from the selected individual image (52a; 62a), the non-underexposed region (56b; 66b) including pixels whose intensity is at least as great as a predetermined threshold value.

10. The microscope (10) according to claim 1, wherein the image acquisition unit (26) is configured to acquire the individual images (28a to 28d) as a sequence of four chronologically successive individual images (28a to 28d), the four chronologically successive individual images (28a to 28d) including a first to a fourth highlight region (36a to 36d), and the first to the fourth highlight regions (36a to 36d) being associated with a first to a fourth illumination direction (24a to 24d), and the first to the fourth illumination directions (24a to 24d) respectively having an azimuth angle (β) of 0°, 90°, 180°, and 270° and an identical elevation angle (α).

11. The microscope (10) according to claim 1, further comprising a displaceable aperture stop in an illumination beam path of the microscope (10), wherein the illumination device (22) generates the at least two different illumination directions (24a, 24b) utilizing the displaceable aperture stop.

12. The microscope (10) according to claim 11, further comprising a control system (40) for controlling the illumination device (22), the control system (40) being configured such that a switchover occurs between a first illumination direction (24a) and a second illumination direction (24b) of the at least two different illumination directions (24a, 24b).

13. The microscope (10) according to claim 1, further comprising a control system (40) that controls the image acquisition unit (26) and is configured to acquire the individual images (28a to 28d; 52a to 52d; 62a to 62d) at a constant image refresh rate ($f_r$) and thus to generate a live stream (44) of multiple combined images.

14. The microscope (10) according to claim 1, wherein the at least one illumination device (22; 22a; 22b) is a single illumination device (22) for illuminating the object (30; 50; 60) from a first illumination direction (24a) and from a second illumination direction (24b) of the at least two different illumination directions (24a, 24b).

15. The microscope (10) according claim 1, wherein the at least one illumination device (22; 22a; 22b) includes a first illumination device (22a) and a second illumination device (22b), wherein the first illumination device (22a) illuminates the object (30; 50; 60) from a first illumination direction (24a) of the at least two different illumination directions (24a, 24b), and the second illumination device (22b) illuminates the object (30; 50; 60) from a second illumination direction (24b) of the at least two different illumination directions (24a, 24b).

16. A method (100) for generating a combined image (34; 54; 64) from multiple individual images (28a to 28d; 52a to 52d; 62a to 62d) of an object (30; 50; 60), comprising the steps of:
    setting at least two different illumination directions (24a, 24b), wherein each illumination direction has a different azimuth angle (β) setting and a different elevation angle (α) setting relative to each other illumination direction;
    illuminating (102) the object (30; 50; 60) from the at least two different illumination directions (24a, 24b) with an illumination device (22) including a ring-light illumination apparatus or an arc illumination apparatus;
    acquiring (104) multiple individual images (28a to 28d; 52a to 52d; 62a to 62d) of the object (30; 50; 60) illuminated from the at least two different illumination directions (24a, 24b); and
    generating the combined image (34; 54; 64) by combining (106) the individual images (28a to 28d; 52a to 52d; 62a to 62d),
    wherein, upon combining (106) the individual images (28a to 28d; 52a to 52d; 62a to 62d), an image information loss associated with an image artifact of one of the individual images (28a to 28d; 52a to 52d; 62a to 62d) is compensated for utilizing an image datum of at least one other of the individual images (28a to 28d; 52a to 52d; 62a to 62d) in the combined image (34; 54; 64).

17. The method (100) according to claim 16, wherein a highlight region (36a), an underexposed region (58; 68), or a low-contrast region is ascertained as an image artifact region, by comparing the intensity values of the individual pixels of the individual images (28a to 28d; 52a to 52d; 62a to 62d) with an upper threshold value or with a lower predefined threshold value, or by performing a contrast evaluation of the image regions.

18. The method (100) according to claim 17, wherein the various individual images (28a to 28d) each having a highlight region (36a to 36d) are acquired and the respective highlight regions (36a to 36d) are associated with the at least two different illumination directions (24a, 24b), the highlight regions (36a to 36d) associated with the at least two different illumination directions (24a, 24b) respectively corresponding to an overexposed region of the respective individual image (28a to 28d).

19. The method (100) according to claim 18, wherein the highlight regions (36a to 36d) are identified by ascertaining those pixels whose intensity is greater than a predetermined threshold value.

20. The method (100) according to claim 16, wherein for combining (106) the individual images (28a to 28d), a highlight region (36a) of a selected individual image (28a) is identified and is replaced by an image datum obtained from a corresponding non-overexposed region (38) of at least one individual image (28b) different from the selected individual image (28a).

21. The method (100) according to claim 20, wherein the non-overexposed region (38) is identified by ascertaining those pixels whose intensity is no greater than a predetermined threshold value.

22. The method (100) according to claim 16, wherein for combining (106) the individual images (52a to 52b; 62a to 62d), an underexposed region (58; 68) of a selected individual image (52a; 62a) is identified and the identified underexposed region (58; 68) of the selected individual image (52a, 62a) is replaced by an image datum obtained from a corresponding non-underexposed region (56b; 66b) of at least one individual image (52b; 62b) different from the selected individual image (52a; 62a), the non-underexposed region (56b; 66b) including pixels whose intensity is at least as great as a predetermined threshold value.

23. The method (100) according to claim 16, wherein the step of acquiring (104) multiple individual images includes acquiring a sequence of multiple chronologically successive individual images (28a to 28d), the multiple chronologically successive individual images (28a to 28d) including different image artifacts (36a to 36d; 58; 68), and the different image artifacts (36a to 36d; 58; 68) being associated with different illumination directions (24a to 24d) that are achieved with the different azimuth angles ($\beta$) and the different elevation angles ($\alpha$) of the illumination directions.

24. The method (100) according to claim 16, wherein the at least two different illumination directions (24a, 24b) are generated utilizing a displaceable aperture stop in an illumination beam path of a microscope (10).

25. The method (100) according to claim 16, wherein the step of illuminating (102) the object (30; 50; 60) includes controlling an illumination device (22) such that a switchover occurs between a first illumination direction (24a) and a second illumination direction (24b) of the at least two different illumination directions (24a, 24b).

26. The method (100) according to claim 16, wherein the step of acquiring (104) multiple individual images includes controlling an image acquisition unit (26) such that the individual images (28a to 28d; 52a to 52d; 62a to 62d) are acquired at a constant image refresh rate ($f_r$), whereby a live stream (44) of multiple combined images is generated.

\* \* \* \* \*